United States Patent [19]

Heide

[11] 4,361,030
[45] Nov. 30, 1982

[54] METHOD FOR LEAK DETECTION IN A PIPELINE SYSTEM AND A MEASURING WELL FOR USE IN A PIPELINE SYSTEM IN THE METHOD FOR LEAK DETECTION

[76] Inventor: Gerhard Heide, Willbeckerstrasse 30, 4006 Erkrath 2, Fed. Rep. of Germany

[21] Appl. No.: 193,577

[22] PCT Filed: Sep. 25, 1979

[86] PCT No.: PCT/DE79/00117
§ 371 Date: May 6, 1980
§ 102(e) Date: May 6, 1980

[87] PCT Pub. No.: WO80/00746
PCT Pub. Date: Apr. 17, 1980

[30] Foreign Application Priority Data
Sep. 25, 1978 [DE] Fed. Rep. of Germany ....... 2841674

[51] Int. Cl.³ ............................................. G01M 3/28
[52] U.S. Cl. ................................................ 73/40.5 R
[58] Field of Search ..................................... 73/40.5 R

[56] References Cited
U.S. PATENT DOCUMENTS 1,693,737 12/1928 Weldon ............................ 73/40.7 X
3,702,074 11/1972 Mullen .............................. 73/40.5 R
3,805,817 4/1974 Smith ..................................... 137/8

FOREIGN PATENT DOCUMENTS 602633 10/1935 Fed. Rep. of Germany .
2807632 3/1979 Fed. Rep. of Germany .
52-2478 1/1977 Japan .............................. 73/40.5 R

OTHER PUBLICATIONS

World Health Org. Proj. No. India 0176.03, 1971–1972.
UMSchau 1964, vol. 1, p. 29.
Z. 3R International, 15th yr., (Jul. 1976), 7: 375–381.
Z. Tu 11, (Jun. 1970), 6: 213–215.
Z. Oel, (1973), 2–6.

Primary Examiner—Edward R. Kazenske
Assistant Examiner—Joseph W. Roskos
Attorney, Agent, or Firm—Millen & White

[57] ABSTRACT

A method and apparatus for the detection of leaks in an interconnected pipeline system are disclosed. The method involves recording flow characteristics over a specific, short time period, e.g., one-half hour daily, at control stations distributed throughout the network. By arranging the control stations in this manner, subnetworks are defined and the existence of leaks therein determined in accordance with deviations in measurements which facilitate localization procedures for the leaks. The apparatus is a well for use at the control stations immovably fixed in the network and accessible from the outside.

15 Claims, 7 Drawing Figures

FIG.1

METHOD FOR LEAK DETECTION IN A PIPELINE SYSTEM AND A MEASURING WELL FOR USE IN A PIPELINE SYSTEM IN THE METHOD FOR LEAK DETECTION

FIELD OF ART

The invention relates to a method for the monitoring of interconnected pipelines or pipeline systems, such as, in particular, public drinking water supply systems, for leakage losses and leakage location, as well as to an installable, prefabricated measuring well usable in conducting the method.

In public drinking water supply systems, considerable losses occur in certain circumstances due to burst pipes, leakages, and the like. Such leakages can occur on account of the weather, i.e. after times of drought or strong freezing the leakage losses are on the rise. Leakage losses of this type are often unrecognizable, because the pipelines are normally laid underground. Losses are understood to mean essentially the amount of water resulting substantially from the difference between the quantity of water supplied to the system and the quantity of water which can be charged to the consumers.

BACKGROUND STATE OF THE ART

For the monitoring of pipelines for leakage losses and for leakage location in these pipelines, it is known in petroleum pipelines to install control stations along the pipelines and to evaluate the flow characteristics detected at those locations, such as flow rate, flow direction, flow noise, fluid pressure, or the like, with reference to the fluid supplied to the lines and removed therefrom and thereafter, upon the detection of a leak, to locate and subsequently eliminate such leak between two such control stations by means of purposeful measuring and locating operations. In case of petroleum or like media deleterious to the environment, monitoring takes place continuously. Evaluation likewise takes place continuously or quasi-continuously (for example in multiplex). Such methods are known, for example, from: "Z. 3R International, 15th year (July 1976) 7:375–381", "Z. TÜ11 (June 1970) 6:213–215", "Z. Öl-Zeitschrift für die Mineralölwirtschaft [Oil Magazine for Mineral Oil Economy] (1973):2–6."

To recognize leakage losses and to locate leakages in interconnected pipeline systems such as, in particular, public drinking water supply systems, it is traditionally customary to travel along the pipeline network and investigate the presence of leaks by means of conventional locating methods. Apart from the fact that only large leaks can be detected, in general, by means of the heretofore customary methods while seepage and noiseless leaks in most cases remain undetected, the conventional method has the disadvantage that a specific point of the pipeline system will be investigated only at very large temporal intervals, in most cases once a year, whereas it is possible for a leak to occur at this point directly after investigation, and this leak will be detected only upon the next investigation. Particularly in case of newly laid pipeline systems examined for leakproofness before being placed in operation, this is a grave disadvantage since the investigation of these pipeline systems in most cases is not begun until several years later.

The losses determined in public drinking water supply systems can markedly exceed 10%, especially if areas with non-reconstructed, old buildings are involved, or if the subterranean conditions are problematic from a geological viewpoint. Since the drinking water must be conveyed under considerable expense and frequently requires treatment (e.g. by means of desalination plants or the like), the socioeconomic losses are considerable.

In case one would apply the methods known in petroleum pipelines, requiring very great accuracy, to the examination of interconnected pipeline systems, a very large number of measuring and control stations would have to be provided, since the conventional methods can only be used for the investigation of conduit sections without branching, even taking house connections into account. Moreover evaluation in the conventional methods takes place continuously. Accordingly, the conventional methods are inapplicable in case of interconnected pipeline systems wherein the conduit length between branching and consumer points sometimes amounts to merely a few meters, not only for practical reasons, on the one hand, but also essentially for financial reasons. Moreover the flood of information and data stemming from the various measuring and control stations and coming in a steady flow is practically no longer processable, even by means of a large-capacity computer.

It is thus an object of the invention to provide a method, by means of which leaks in interconnected pipeline systems can be detected at maximum speed and in an economical fashion.

SUMMARY OF THE INVENTION

The invention is based on the realization that the habits of consumers possess a certain, repetitive rhythm whereas the losses at a leakage point remain essentially constant. Furthermore the invention is based on the realization that leaks affect not only the flow characteristics in the short conduit section between two branching points, but also influence neighboring conduits, i.e. an again interconnected, subordinate pipeline network of the entire pipeline system. The invention attains the object in a method of the type disclosed hereinabove in that, in monitoring interconnected pipeline systems, such as public drinking water conduit networks, in particular, in the course of which the control stations are disposed, these control stations are arranged within an interconnected subordinate conduit network for the formation of control districts which latter can be connected to one another or can also be separate; and in that the flow characteristics are automatically detected and evaluated by these control stations during a short-term measurement of about one-half hour daily, taking place regularly and always within the same measuring time, especially during the night hours or during time periods when the regularly measured flow characteristics remain essentially constant over comparatively very long time intervals, as in times of low consumption, but taking place for all control stations substantially simultaneously.

This has the result that the information and data to be processed in the evaluation are readily reviewable, wherein, on the other hand, a leak can be detected already shortly after its formation. Furthermore, leaks can be detected of an order of magnitude not detectable by means of the methods used heretofore in connection with water pipeline systems. The exact location of the leak can then be determined at comparative speed, starting with the determination of the control district wherein the leak has occurred, by means of conventional methods or by a stepwise repetition of the method of this invention, and can then be eliminated very quickly. Due to the fact that time periods are utilized for detecting the flow characteristics, during which consumption is low, wherein the consumption level remains essentially constant over relatively long periods of time, the sensitivity in leak location is greatly increased, since the measuring instruments can be matched to this essentially constant level with respect to their measuring range and thus also their range of sensitivity. Locations especially advantageous for control stations are those where a flow reversal takes place on account of consumers' habits and thus regularly.

The evaluation of the measurements can take place at the site, as well as in a central station.

Another advantage in the method of this invention is that already existing leaks can be detected as well, wherein, however, first a statistically averaged level of the measured flow characteristic must be determined for the time interval of the short-term measurement; starting with the actually determined measured value, a conclusion may then be drawn to the presence of an already existing leak. This leak can then be determined with respect to its exact location by means of conventional methods.

To effect the method of the invention, an installable, prefabricated measuring well is particularly advantageous for the provision of a control and/or measuring station. It is possible to quickly install such a measuring well and also equip same with a view toward the respective flow characteristic of interest, or to alter the type and function of the measurement depending on the requirements.

The invention is advantageously further developed by the additional features characterized in the dependent claims.

BRIEF DESCRIPTION OF THE DRAWINGS

The invention will be explained in greater detail below with reference to the embodiments illustrated in the drawings wherein:

FIG. 1 shows schematically a representation of an interconnected pipeline system wherein the invention is applied;

DETAILED DISCUSSION OF THE INVENTION

Figure 2:
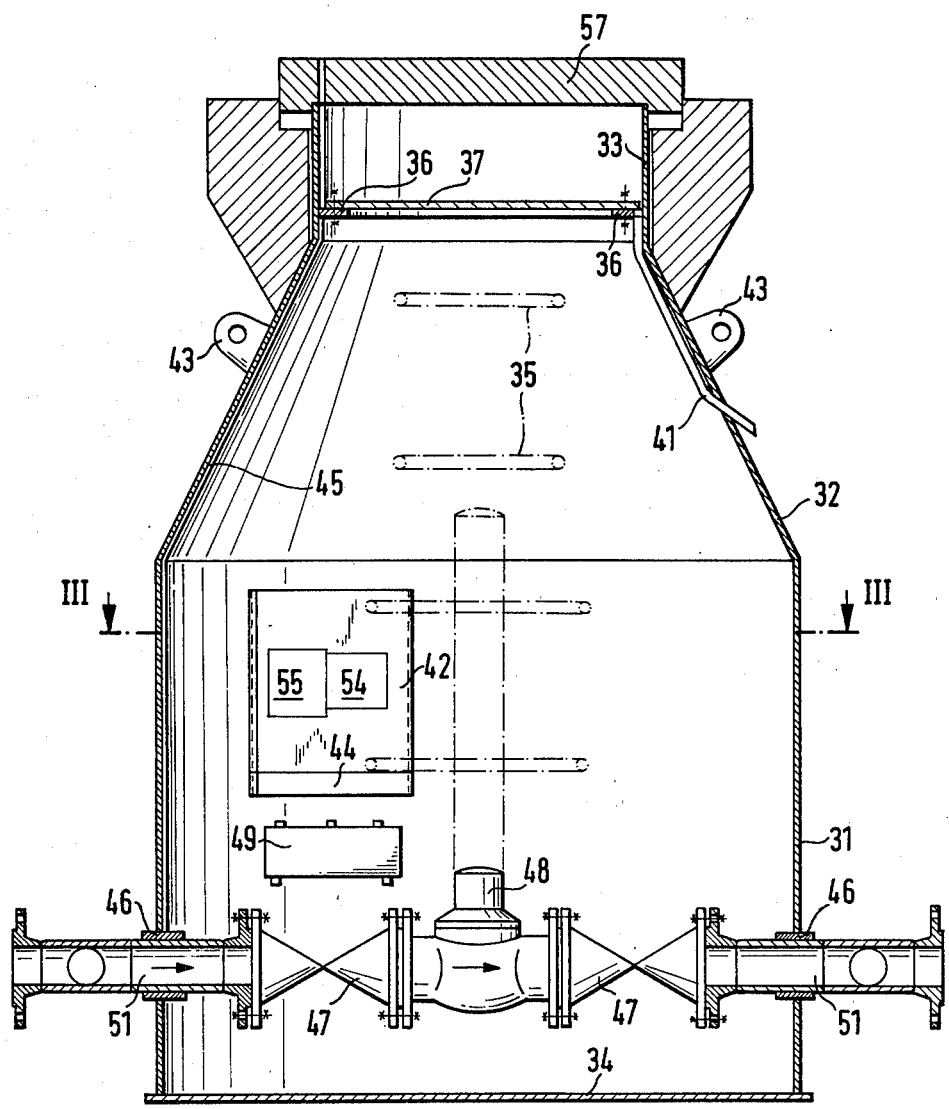
FIG. 2 is a sectional view of a prefabricated, installable measuring well.

Best Mode for Carrying Out the Invention

Figure 1:
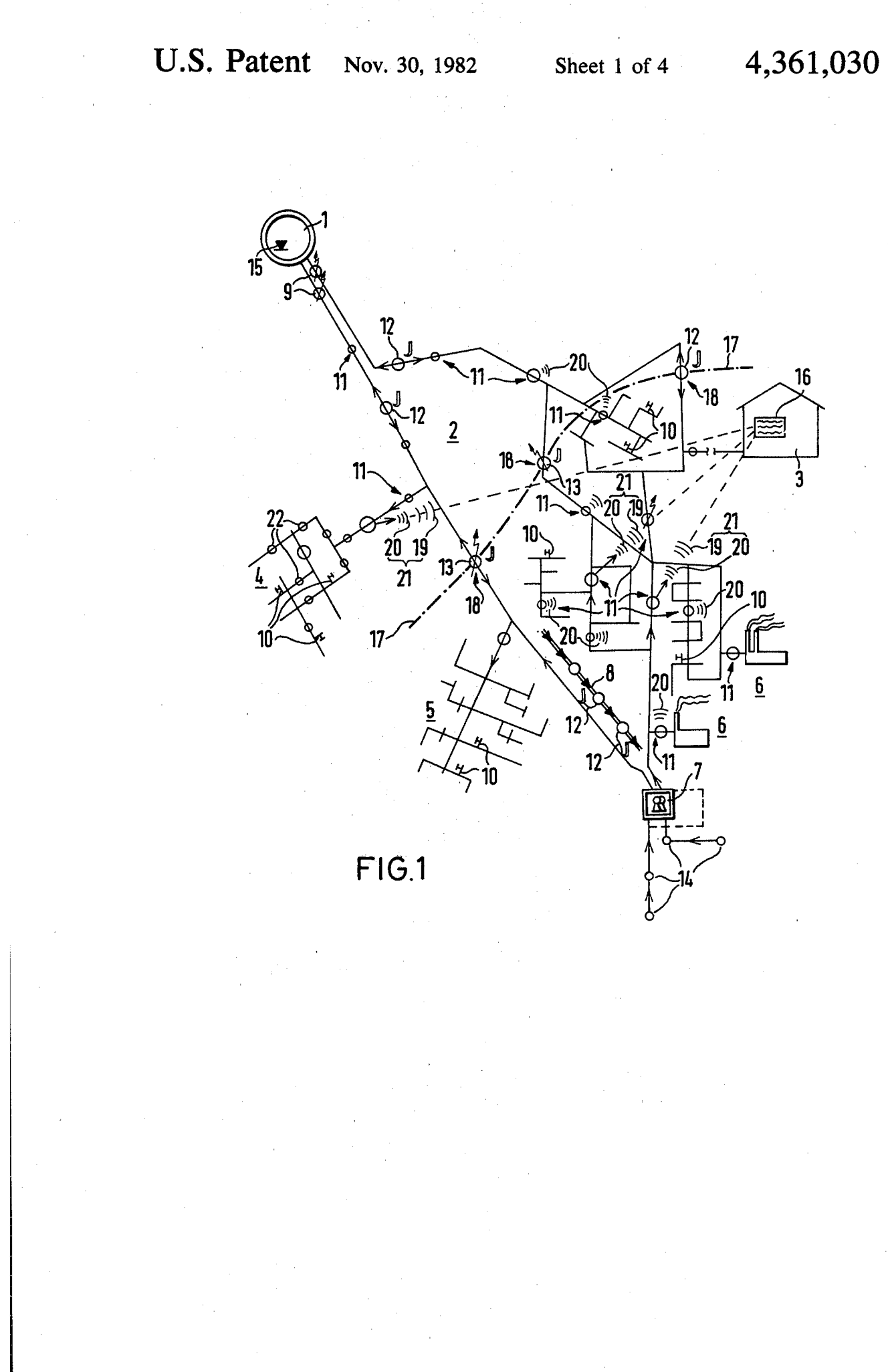

The public drinking water pipeline system 2, shown schematically in FIG. 1, has a typical layout. Treated drinking water is supplied to the water network 2, on the one hand, from a high-level tank 1, the level of which is detected by a measuring device 15. On the other hand, the water system 2 receives water from a pumping station with ground reservoir 7, to which water is fed from supply wells 14. Furthermore the water system 2 is linked with waterworks 3 as the center. Water system comprises as typical components an old-city area 4, a newly built-up area 5, as well as industrial areas 6. Furthermore a conduit section of a sewer canal 8 is schematically indicated, constituting part of a similar canalization system. Arrows in the conduits of the water system 2 indicate the customary flow direction of the running drinking water.

Various measuring and control stations are arranged in the water system 2 and can serve for executing the invention.

In particular, provided are control stations 9 with inductance measuring design, hydrants 10 constructed as control stations or designable as control stations, and measuring wells constructed as control stations, as illustrated in FIGS. 2-5.

Control stations 12 are provided wherein measurement is conducted in two directions, as indicated by the symbol J, as well as control stations 13 effecting an inductance-type measurement in two directions, as explained by an arrow symbol. Several control stations 18 are arranged along a line passing through turning points of the pipeline system with respect to flow characteristic, as indicated by the dot-dash line 17.

As shown in several control stations, the measured values detected therein are transmitted to the central station 3 and recorded on a schematically illustrated multiple printer 16. The measured value transmission can take place in a wireless fashion as indicated by the symbol 19. A local signal 20 which indicates that the average value of the flow characteristic has been exceeded at the corresponding control station 11 during the short-term measurement can be isolated, but it can also be provided in combination with the measuring signal transmission 19 to the central station 3, as indicated by 21.

As can furthermore be seen from FIG. 1 on the basis of the schematic illustration, several control stations 11 are designed so that they are constantly in operation, i.e. they conduct the short-term measurement regularly, while other control stations are placed in operation only in case a leak has been indicated by the continuously operated control stations in the control district monitored by the latter. In the same way the hydrants 10 can also be utilized as a control station 22 only once the continuously operated control station 11 of the respective control district has indicated a leak.

This can be seen particularly clearly in the old-building area 4 which, on the one hand, is greatly intermeshed, but, on the other hand, is also greatly susceptible to leak formation.

It has been found that, although consumers' habits can differ and fluctuate very greatly in high-consumption periods, there are low-consumption periods during which consumers' habits are subjected to practically no fluctuations. The early morning hours between 1:00 AM and 3:00 AM (abroad frequently between 4:00 AM and 6:00 AM) can be considered to be most favorable, wherein the water losses exceed, in part, the normal night consumption considerably, so that measurements can be carried out particularly efficiently during these low-consumption times. A short-term measurement of about one-half hour daily, or also weekly, during this time period is adequate to obtain very accurate indications of leaks in the respectively monitored control district. Since during these low-consumption periods the measured flow characteristic is very constant and without strong fluctuations, and the measuring devices employed are operated only during this short-term measurement, comparatively small leaks can be identified which, though exerting practically no influence on the level of the flow pattern during the main consumption hours, can be detected at the comparatively low level during the short-term measurement. By the choice of suitable measuring instruments, leaks having a loss of less than 0.5 m$^3$/h can be identified if the flow characteristic is distinguished by particular regularity, such as, for example, in purely residential areas.

The method of this invention is also suitable for determining and locating old, already existing leaks, i.e. those leaks present prior to the installation of the control stations 11. In this respect, the realization is likewise kept in mind that a leak, but also the elimination of a leak, has considerable and far-reaching effects on the flow characteristics in at least a partial system which need not coincide with the control district, so that in this way also existing leaks can be progressively recognized after provision of the control stations and/or after installation of the measuring wells in an interconnected network, and can then be eliminated. The procedure, though, must be somewhat different when evaluating the measured results for detecting the old leak than in case of evaluating the results to determine newly arising leaks.

First of all, it is necessary to determine an average water loss value of the entire interconnected pipeline system, i.e. of the water supply network 2, resulting from the total yearly loss determined in a yearly accounting, converted to m$^3$/h, and from the length of the water supply network 2. From this, an individual, average consumption value can be determined during the short-term measurement for each control district and thus for each control station 11. Starting with the deviation of the measured actual consumption figure and the predetermined average consumption figure, a conclusion can be drawn with regard to the water losses of the control district. Then, starting with the determination of the magnitude of the losses in the control district, the loss-causing pipeline section and, in the final analysis, the leak location, can be pinpointed by conventional locating procedures.

Conventional methods for leak location are: (i) the so-called valving-off operation, i.e. the separation of partial sections within the interconnected partial network, (ii) the so-called listening method by means of mobile measuring instruments from the surface, (iii) the artificial generation of changes in flow, for example by the production of a pressure surge, and evaluation of the thus-resulting changes in the measured values, (iv) the excavation, i.e. uncovering of the pipeline and visual inspection, which latter procedure should be conducted, for reasons of economy, only when the site of the leak has been pinpointed to a comparatively short pipeline section, especially since an excavation must be made anyway to eliminate the leak, (v) the measurement of acoustic properties of the leakage site at pipeline contact points.

While it is possible, when constructing new pipeline networks in, for example, new building areas, to provide the site of the control station 11 as early as during the planning stage, it can be advantageous in case of already existing pipeline systems, such as in old building areas 4, in addition to a purposeful installation, to arrange control stations at the site of detected and excavated leaks, since in such a case the fact that an excavation pit exists can be exploited in a practical and economical fashion. Such control stations can very well be those which are not constantly operated.

It is suitable for leak locating to arrange control stations 11 in the water supply network 2 in such a way that the monitored control district comprises a very minor pipeline length, depending on the type and condition of the respective pipelines. If the control point is a control station 18 where the water flows in different directions, a larger pipeline system length can be monitored.

It is to be noted that the method of this invention is also suitable for monitoring systems practically uncontrollable by means of the conventional methods, such as, for example, network sections of nonmetallic materials (asbestos cement or the like).

Already existing manholes and also hydrants (control points 10, 22) can be utilized as control stations, where merely the required measuring instruments must be arranged. If, for reasons of space, only the measuring probe can be provided, the measuring instrument can also disposed in wells which are part of other pipeline systems, such as electric current supply systems and storm sewer systems, as shown in FIG. 1 in connection with part 8 of the sewer system.

It is particularly advantageous to provide prefabricated, installable measuring wells for the control stations 11, 18.

Such an installable, prefabricated measuring well is illustrated in FIGS. 2-5.

Figure 5:
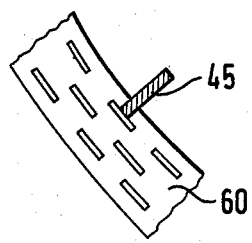
FIG. 5 shows a constructional alternative of part of the measuring well according to FIG. 2, FIGS. 6, 7 show in a longitudinal sectional view and a cross-sectional view, respectively, another construction of a control station.
Figure 4:
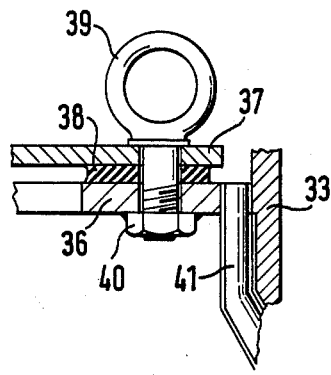
FIG. 4 shows a detail of the measuring well according to FIG. 2.

Such a measuring well consists, for example, of a cylindrical casing 31, a conical casing 32, and a casing neck 33 connected to one another as well as to a bottom 34, for example by welding if weldable material, such as steel sheet, is involved. As shown in FIG. 5 the casing can also consist of a steel-reinforced synthetic resin, such as GFRP (glass-fiber reinforced plastic). Stirrups 35 are mounted on the wall for access to the interior of the measuring well. In the embodiment shown in FIG. 2, an annular flange 36 is welded to the inside of the lid neck; a lid 37 can be attached to this flange in the way illustrated in FIG. 4. For this purpose a gasket 38 is arranged between the lid 37 and the flange 36; the lid 37 can be tightly connected to the flange 36 by means of ring bolts 39 penetrating the gasket 38 and the flange 36 and engaging nuts 40 welded to the flange 36. To drain water entering from above the lid 37, such as rainwater, a rainwater drainpipe 41 is provided at the rim which removes the entering water to the outside of the casing 31, 32, 33. Lifting hooks 43 are arranged on the outside of the casing, particularly at the casing cone 32, by means of which the measuring well can be transported from the storage site to the installation site and can be lowered into the excavated pit provided at that location.

A console or measuring panel 42 is mounted on the inside of the measuring well, wherein, as illustrated, a silica gel chamber 44 can be provided which is suitable, in particular, for measuring wells in tropical climate design. Especially in case of measuring wells having a synthetic-resin casing, a contact strip 45 is provided which can be extended, as a signal-transmitting means, toward the outside of the measuring well and thus can also be scanned from the outside, as shown schematically in FIG. 2.

The pipeline of the conduit system 2 to be monitored (FIG. 1) is extended into the measuring well and exits again therefrom. At the point of penetration through the casing 31 a rust protection means 46 is provided, such as, for example, an appropriate anticorrosive paste. The pipeline can be passed through as illustrated by means of pipe nipples 51 welded to the sheet-metal casing 31. Along the length of the pipeline to be monitored, i.e. between the two pipe nipples 51 penetrating the casing 31, a measuring device 48, such as a flowmeter or the like, is arranged between two slide valves 47, wherein this measuring device 48 as indicated by a dot-dash line, can very well have a differing structural height within the measuring well, depending, on the one hand, on the measuring variable, on the other hand on the measuring range dependent on the level to be recorded, and on the sensitivity. In parallel to this device constituted by the pipe nipples 51, the slide valves 47, and the measuring instrument 48, a bypass 50 (a so-called shunt line) can be provided branching off from the pipe nipple 51 as illustrated outside of the casing 31, but also, if space conditions make this possible, within the casing 31, enabling a flow of the monitored medium in case of necessity, such as, for example, during servicing work or exchange operations at the measuring instrument 48. The bypass has slide valves 52 in a similar fashion, these valves being equipped with blind flanges 53. If necessary, the blind flanges 53 are replaced by a conduit section or another measuring instrument and then the slide valves 52 are opened.

At least one measuring device for the variable detected by the measuring unit 48 is arranged in the measuring panel 42. Connecting lines between the measuring unit 48 and the measuring panel 42 are not illustrated. If electrically operating measuring units 48 and measuring devices 54 are involved, an electric current supply, such as a battery 49, can be arranged in the measuring well. Here again, the necessary connecting lines and cables are not illustrated. Furthermore a signal generator 55 is arranged in the illustrated measuring panel 42, which generator can also be constructed as a measured value transmitter to emit a signal, such as an alarm signal 20 (FIG. 1) to the outside of the measuring well and/or to pass a measured value signal 19 (FIG. 1) by remote transmission to the central station 3 (FIG. 1). This remote transmission can take place in a wireless fashion. The battery 49 can be chargeable or rechargeable.

Figure 3:
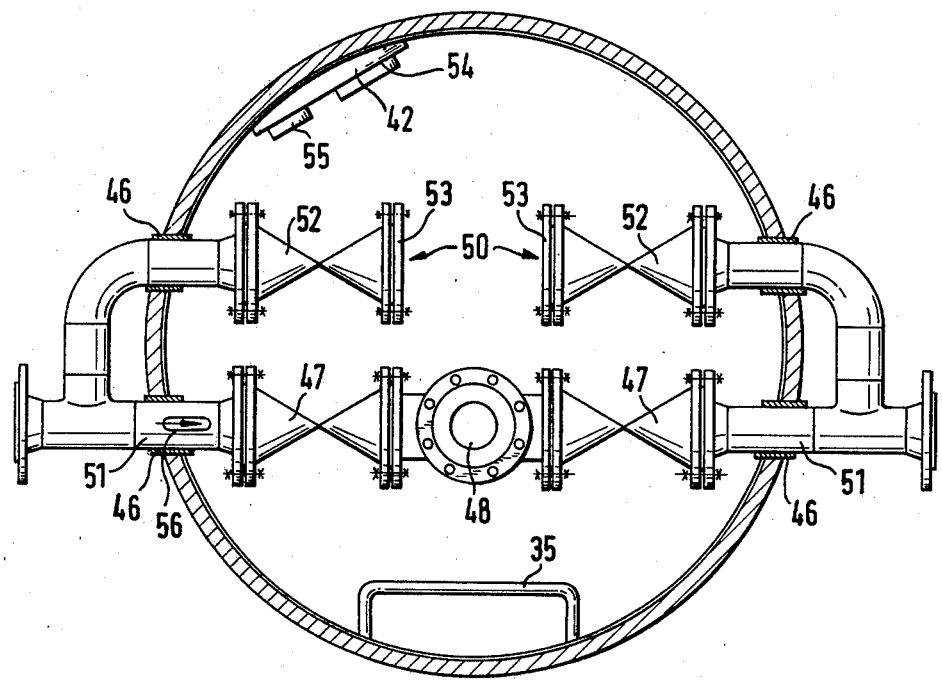
FIG. 3 shows the section III—III in FIG. 2.

In FIGS. 2 and 3 the flow direction of the flowing medium (drinking water) is represented by an arrow. The flow characteristic in one flow direction can additionally be measured by a sensor 56. The measured result obtained by the sensor 56 can be passed on in the same way to the measuring panel 42 and can from there be evaluated and/or transmitted with the aid of appropriate measuring devices and signal transmitters. The measured result can also be transmitted, as indicated in FIG. 2, toward the outside by way of the contact strip 45.

Finally, a customary manhole cover 57 is arranged at the top end of the measuring well, by means of which communication to the surface is established and the measuring well is protected from environmental influences, the effects of traffic, wetness, and so on.

The measuring well can, of course, also be of a square shape and the bypass 50 can also be extended beneath the main direction of flow. Also it is possible to provide several measuring panels 42. The equipment with measuring unit 48, sensor 56, measuring device 54, and measuring transducer 55 as well as battery 49 depends on the circumstances of a particular case, i.e. on the site and the flow conditions at the respective control point.

Instead of the battery 49, a customary power outlet connection can also be provided, for example.

Furthermore, an ultrasonic measuring device can be arranged in the measuring well to detect the flow noise.

The measuring device 54 can consist of several parts, such as integrators, pulse generators, counters, etc., serving for the evaluation of the (analogous) measured results by the measuring system 48, 56. It will be advantageous, for example, for the signal generator 55 to transmit an alarm signal 20 to the outside of the measuring well only if, during at least two successive short-term measuring periods, the alarm condition has been met. Thereby it is possible to prevent accidental excesses in constant consumption during low-consumption periods (for example during New Year's Eve) from being identified as the occurrence of a leak.

Figure 6:
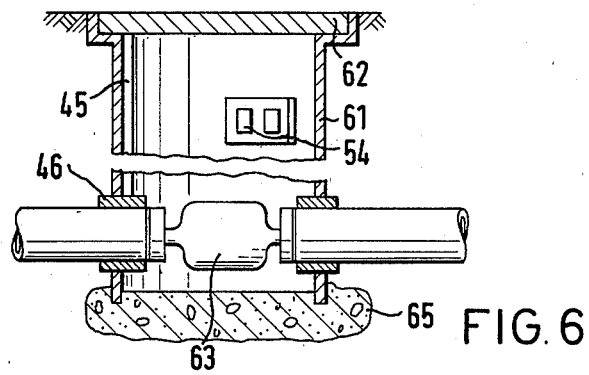
Figure 7:
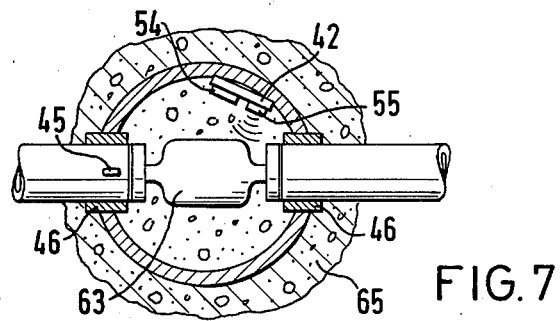

As mentioned above, only a specific number of control stations or control points 11, 18 is constantly operated to perform the short-term measurement. In particular in case of the control points 18 along the dot-dash line 17, more than one measurement will be conducted. Other control stations 11 in the water supply system 2 are not operated constantly but rather only if one of the constantly operating control stations 11, 18 or control points has determined a leak in the respectively monitored control district. If the latter control stations are provided with measuring devices and measuring units, their operation can, of course, be triggered by remote control. Suitable as control stations 11 of the latter type are also hydrants 10 constructed as control point 22. A control point 22 (FIGS. 6 and 7) comprises a casing 61 and a customary street cover 62. Along the course of the pipeline conducted through the control point 22 is a measuring unit such as, for example, a water meter 63; furthermore, a measuring panel 42 with a measuring device 54 and a signal generator 55 is mounted to the wall of the casing 61. The pipeline extension through the casing 61 likewise exhibits the anti-corrosion means 46. Furthermore a contact strip 45 can also be provided if desired. The control point 22 and/or the casing 61 thereof can have a fixedly attached bottom, but it can also be inserted in a concrete base 65, as illustrated.

As explained above, a certain distribution of the control stations or control points 10, 11, 18, 22 in the entire water supply network 2 is advantageous. This can be effected stepwise, in which case the measuring units and measuring devices at the individual control stations or control points 10, 11, 18, 22 may have to be exchanged for different ones, especially if already existing leaks are eliminated stepwise in the above-explained way, since the flow characteristics can also change at those locations on account of leak elimination.

The measurement during the measuring period can be executed by triggering the measurement under control from the central station, or by effecting the triggering individually in each measuring well. It is important that the recording of the measured value and optionally the transmission of the measured value take place merely during the short measuring period which is the same for all control stations.

In addition to the identification of leaks and the locating thereof, complaints by consumers can be dealt with also more quickly in some cases on the basis of the measured results. Moreover the control of the total water household, the water treatment and water supply, the water consumption, etc., can be achieved for industrial management purposes for accounting and cost control in substantially shorter time intervals than heretofore customary, even if the actual accounting to customers generally takes place only once a year. Further, measuring means can, of course, additionally be provided which examine the water with respect to its quality.

The invention is, of course, not limited to the application to drinking water supply networks. The invention can also be utilized, for example, for wastewater systems and long-distance heating systems, i.e. generally for interconnected supply and discharge systems wherein a leak does not cause environmental contamination, but wherein an early detection is desired for economical reasons.

Commercial Exploitability

It is possible by means of the method of this invention to determine leaks in public pipeline systems relatively quickly in a comparatively economical fashion. The losses usual and heretofore tolerated in drinking water supply networks of far above 10% can be greatly reduced so that the initial investment costs which may be high for a short time, namely when the method is introduced, are amortized within a relatively short period of time. In this connection, one must keep in mind, in particular, that the drinking water must first be expensively treated or must be purchased from outside sources. Both situations cause considerable expenses. Expenses can now be saved in considerable amounts in view of the fact that it is now possible by the method of this invention to detect newly arising leaks, as well as old, already existing leaks, additionally at a leak rate which is markedly below the rate heretofore detectable. Moreover, the leaks can be identified very quickly. Thereby the consumption costs of the individual, who, after all, is not responsible for the leaks, can also be reduced, as seen in the long run, since the consumer has heretofore participated in the losses through leaks, on the one hand by way of the water sales price, on the other hand by way of public contributions (taxes) utilized for compensating such financial losses of the waterworks.

I claim:

1. In a method for monitoring an interconnected pipeline distribution network, for losses resulting from leaks, the network being comprised of a plurality of subnetworks, wherein at least one flow characteristic is recorded and analyzed at check sites for a particular subnetwork at given times in an automatic manner over a test-time interval, and whereby leaks detected in the subnetworks are localized by specific test and localization procedures, the improvement comprising:
arranging the check sites across the distribution network in a spatially fixed arrangement, and measuring the flow characteristics during an always equal time interval of about ½ hour at least one of once a day, and once a week, at all check points at those times when the regularly measured flow characteristic remains substantially constant over a substantially long time interval.

2. A method as in claim 1, further comprising analyzing the measured flow characteristic for selecting additional check sites in the distribution network, or in a particular subnetwork, for passing into a pin-point localization mode comprising constantly and continuously monitoring said additionally selected check sites for more specifically detecting and localizing a leak ascertained in a subnetwork.

3. A method as in claim 1 or 2, further comprising selecting check sites as locations in the distribution network wherein there occurs a regular reversal of flow direction.

4. A method as in claim 3, further comprising artificially generating changes in flow direction for the purpose of rapidly localizing leaks in the distribution network.

5. A method as in claim 1, further comprising transmitting test values to a remote control station wherein they are recorded and analyzed.

6. A method as in claim 1, further comprising recording test values at the check sites.

7. A method as in claim 5 or 6, further comprising initiating the recording of the flow characteristic by remote control.

8. A method as in claim 1, wherein said check sites are immobile structures forming part of the network, and being accessible from the outside.

9. A prefabricated measuring well adapted for being integrated in an immobile manner into a pipeline distribution network as a check site for implementing a method of monitoring the network for losses resulting from leaks, wherein check sites are arranged across the distribution network in a spatially fixed arrangement for measuring a flow characteristics at each check site during an always equal time interval at least one of once a day, and once a week, at all check points at times when the regularly measured flow rate characteristic remains substantially constant over a substantially long time interval, the measuring well comprising:
casing means (31, 32 and 33, 61) having passage opening means (46) comprising an inlet and an outlet for allowing a pipeline (51) of the distribution network which is to be measured to pass therethrough, said passage opening means (46) forming a hermetic seal with the pipeline (51) at the inlet and outlet thereof, and said casing means being open at the top and having cover means (35, 57, 62) for hermetically sealing said casing means at the open top at least one of a test panel means (42) and an instrument box means mounted on an inside wall of said casing means (31, 32 and 33, 61) and having at least one test instrument means, and at least one of a flow characteristic test sensing means (48, 56, 63) and a flow-meter signal generating means operatively associated with said test panel means or instrument box means, and mounted in said pipeline (51) between the inlet and outlet.

10. A measuring well in claim 9, further comprising a test value transmitting means (55) connected to said test instrument means (54).

11. A measuring well as in claim 9 or 10, wherein said cover means (37, 57) comprises two parts, and wherein said cover means defines a space in said measuring well for locating sensitive test instruments therein, the lower of said two parts (37) sealing the inside space of said measuring well by means of an annular seal (38) connected to said casing means (31, 32 and 33) for preventing substantial penetration of water from the outside into said inside space.

12. A measuring well as in claim 10, further comprising autonomous power supply means for at least one of said test instrument means (54), said test value transmitting means and said test sensing means (48, 56, 63).

13. A measuring well as in claim 10, further comprising means for tapping the signal from at least one of the test instrument means (54), the test sensing means (48, 56, 63) and the signal generating means (55) for an outside readout.

14. A prefabricated measuring well adapted for being integrated in an immobile manner into a pipeline distribution network as a check site for implementing a method of monitoring the network for losses resulting from leaks, comprising:

casing means (31, 32 and 33, 61) having passage opening means (46) comprising an inlet and an outlet for allowing a pipeline (51) of the distribution network which is to be measured to pass therethrough, said passage opening means (46) forming a hermetic seal with the pipeline (51) at the inlet and outlet thereof, and said casing means being open at the top and having cover means (35, 57, 62) for hermetically sealing said casing means at the open top, at least one of a test panel means (42) and an instrument box means mounted on an inside wall of said casing means (31, 32 and 33, 61), and having at least one test instrument means, and at least one of a flow characteristic test sensing means (48, 56, 63) and a flow-meter signal generating means operatively associated with said test panel means or instrument box, and mounted in said pipeline (51) between the inlet and outlet.

15. A measuring well as in claim 9 or 14 wherein said well is an immobile structure forming part of a distribution network, and is accessible from the outside.

* * * * *